United States Patent Office 2,799,532
Patented July 16, 1957

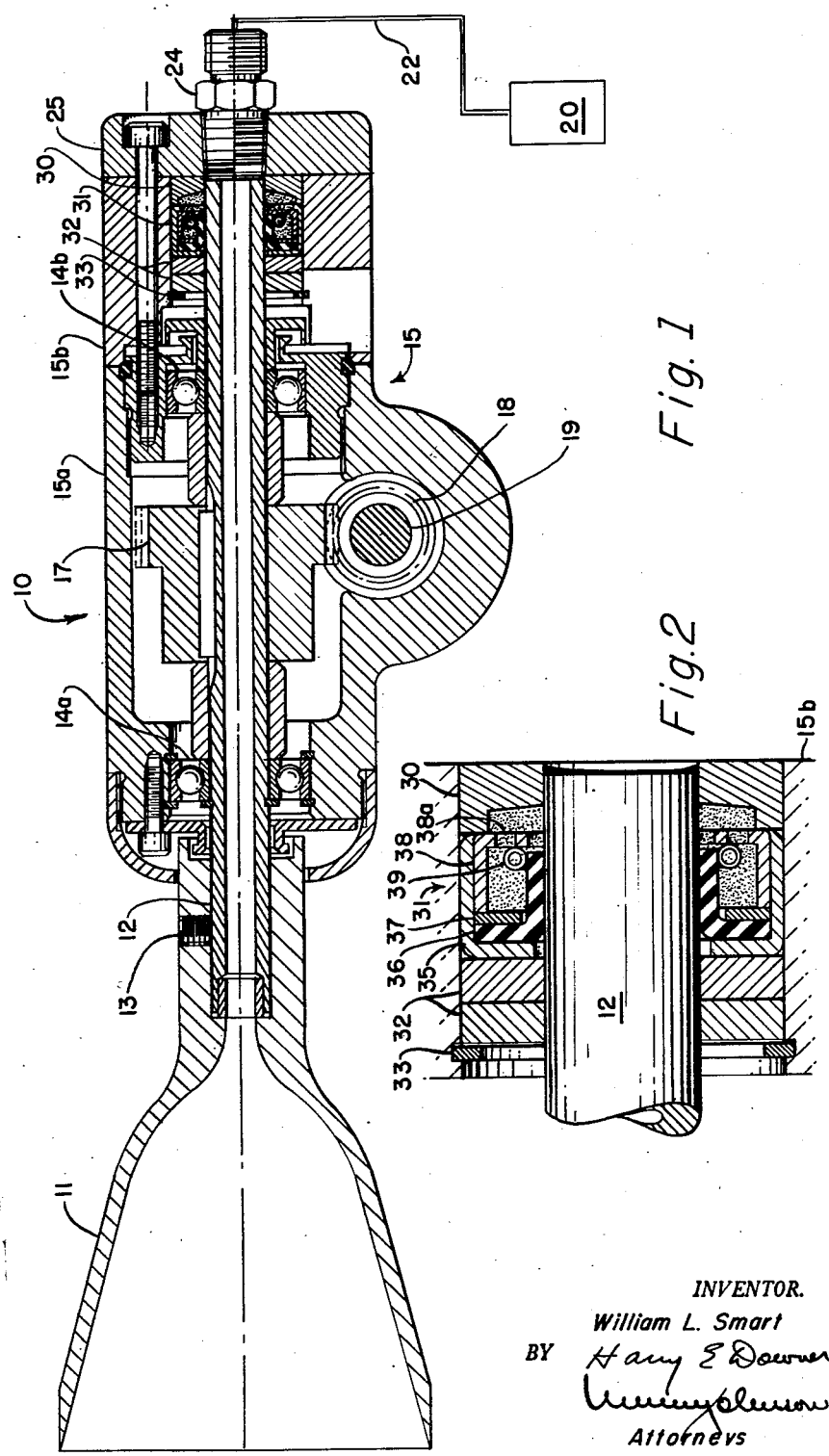

2,799,532
LIQUID SEALING APPARATUS

William L. Smart, Indianapolis, Ind., assignor to Ransburg Electro-Coating Corp., Indianapolis, Ind., a corporation of Indiana Application May 24, 1954, Serial No. 431,691

2 Claims. (Cl. 299—63)

My invention relates to sealing apparatus which prevents the entry of liquid into the bearing structure of a rotatable shaft.

Rotatable shafts are generally supported by some form of bearing structure which is a part of or mounted within a housing. My invention is applicable to the protection of plain journal bearings as well as conventional rolling contact bearings like ball or roller bearings wherein the inner and outer races of the bearing are supported on the shaft and housing respectively.

Where the shaft is hollow in order that a liquid may be fed axially through the shaft as it rotates, problems arise in adequately protecting the bearing structure against entry of the liquid. In the electrostatic coating field it is common practice to feed liquid coating material such as paint, lacquer and the like from a reservoir through a stationary tube to the rotating shaft of an atomizing device. Coating material flows through the hollow shaft and onto the rotating surface of the atomizer to be atomized into a spray of liquid particles which are electrostatically deposited as a coating on articles of manufacture.

It is well known that certain liquid coating materials, particularly some pigmented paints, have extremely abrasive qualities and that on exposure to air most liquid coating materials leave a gummy residue. Moreover, liquid coating materials generally contain solvents which readily attack the usual materials comprising conventional liquid sealing devices. Thus the life of conventional sealing devices used in commercial spray coating apparatus is relatively short and once the liquid coating material leaks past the seal, its abrasive and gummy qualities soon render the bearing structure and other moving parts of the atomizing device unserviceable. It is therefore desirable, if not imperative, in the efficient and continued operation of a rotating atomizing device that the liquid should not reach the bearing structure of the shaft.

No conventional rotary shaft seal was found to work satisfactorily. By the term "rotary shaft seal" I mean a sealing device between a shaft and a housing between which there is relative motion and include known oil seals, face seals, chevron seals of the V and U types, stuffing box materials and related packings. The problem is accentuated by the fact that an atomizing device should be adjustable to permit the axis of its shaft to be fixed in any given position and the liquid coating material must not reach the bearing structure of the shaft regardless of its orientation and regardless of whether the shaft is stationary or is being rotated.

Some types of rotary shaft seals alone are excellent seals for a relatively heavy, generally chemically inert liquid such as mercury or a mercurial liquid, even though such conventional seals fail rapidly when exposed to the grinding and solvent action of a paint. By "mercurial liquid" I mean any liquid or mixture possessing physical properties generally similar to pure mercury. The use of mercury as a sealing liquid is known but being a liquid, mercury is not able to resist the usual liquid pressures existing in the liquid supply lines of rotating electrostatic atomizing devices. I have discovered, however, that highly effective sealing protection against the entry of liquid coating materials can be obtained by a novel sealing arrangement comprising a rotary shaft seal having an annular sealing element encircling and in contact with the rotating shaft together with a mercurial liquid substantially filling an annular chamber in the housing encircling the shaft closely adjacent the rotary shaft seal so that the mercurial liquid is in contact with at least a portion of the sealing element.

It appears that mercury, in addition to preventing the abrasive and solvents of the liquid coating material from reaching the rotary shaft seal, is an excellent conductor which transmits friction-generated heat away from the sealing element of the shaft seal with which the mercury is in contact to effect a beneficial cooling of this element. With the mercury in contact with the sealing element of the rotary shaft seal, rather than spaced from it, any air pocket between the two is eliminated. Heating or other expansion of such an air pocket tends to force the mercury out of its chamber away from the shaft seal. On the other hand an excessive liquid line pressure compresses such an air pocket and forces the mercury out of its chamber toward the shaft seal and this wets the mercury chamber with coating material and tends to cause undesirable mixing of the mercury and the oils of the liquid coating material which will decrease the sealing effectiveness of the mercury. Tests indicate that apparatus constructed in accordance with my invention will increase the useful life of the seal from two to ten or more times that of a conventional rotary shaft seal.

My invention is particularly adapted for use in feeding liquid coating material to a rotating atomizer used in an electrostatic coating system. However, the invention has many uses and may assume many different forms. For convenience of illustration there are shown in the drawings and will now be fully described an embodiment of my invention in an electrostatic coating system which will illustrate the principles of the invention. The scope of the invention is not limited to the following description.

In the drawings Fig. 1 is a cross-sectional elevational view of a rotatable atomizing device embodying one form of my invention; and Fig. 2 is a detailed view of the sealing apparatus shown in Fig. 1.

Fig. 1 shows an annular-edged atomizing device 10 which includes a flaring atomizing bell 11 mounted on one end of a rotatable hollow shaft 12 by means of a set screw 13. Bell 11 has an inner liquid-guiding surface extending outwardly from the juncture of bell 11 and shaft 12 toward the bell's annular edge. Bell 11 and shaft 12 are supported by two ball bearing assemblies 14a and 14b mounted within an atomizer housing 15 composed of front housing 15a and rear housing 15b. A helical-toothed gear 17 is mounted on the central portion of shaft 12. The teeth of gear 17 mesh with the teeth of a second gear 18 mounted on shaft 19. Rotary power means (not shown) supplies power to rotate the shaft 19 and gear 18 and thereby to cause the rotation of gear 17 together with shaft 12 and atomizing bell 11.

Liquid coating material to be atomized is fed from a reservoir 20 at a controlled rate through a stationary liquid feed line 22 and a coupling 24 fitted into a passageway in a back plate 25 which is securely affixed to the rear housing 15b. The passageway in back plate 25 is concentric with rotating shaft 12. Liquid coating material is thus fed through the passageway in back plate 21 to the interior of rotating shaft 12 and flows through the shaft to the inner surface of atomizing bell 11 where centrifugal force will cause the liquid to spread into an expanding thin film for atomization from the annular edge of the bell.

In order to prevent any of the liquid coating material from flowing around the end of shaft 12 and along its outer surface or by some other path finding its way to the bearings and gears of the atomizing device, there is provided a novel sealing arrangement shown in greater detail in Fig. 2. Rear housing 15b has an annular cavity which concentrically surrounds the rear portion of shaft 12 and into which is fitted a grooved mercury retainer 30 which rests against back plate 25, a rotary shaft seal 31 and one or more spacing rings 32, all held in place by a snap ring 33 inserted into an annular groove in rear housing 15b.

Although my invention is in no way limited thereto, rotary shaft seal 31 as shown is an oil seal generally similar to "Perfect" oil seal No. 10016–K200 manufactured by the Chicago Rawhide Manufacturing Company. Seal 31 comprises an outer retainer 35 whose outer surface fits snugly into the annular cavity in rear housing 15b. An L-shaped flexible sealing element 36 made of impregnated leather or the like is securely positioned between outer retainer 35 and a ring 37 which is held in place by an inner retainer 38. A garter spring 39 urges the free end of flexible element 36 into sealing contact with the outer surface of shaft 12. A plurality of holes 38a are provided in the side wall of inner retainer 38.

The groove in mercury retainer 30 together with the void space within the oil seal 31 provides an annular chamber which is substantially filled with mercury or a mercurial liquid exhibiting physical properties generally similar to mercury. Holes 38a in inner retainer 38 provide easy access for the mercury to completely fill both the groove formed by retainer 30 and the void space within seal 31 itself.

The snug fit between the wall of the annular cavity of housing 15b and the outer surface of retainer 35 of seal 31 forms an effective barrier which prevents any liquid coating material from flowing between the seal and housing 15. At the same time the mercury in the chamber formed by mercury retainer 30 which is in contact with the outer wall of shaft 12 will prevent liquid coating material from flowing forwardly along the outer surface of shaft 12 toward bearing assembly 14b. The liquid pressure in liquid feed line 22 and the interior of hollow shaft 12 will be transmitted through the mercury to the flexible element 36 of seal 31, and even though a considerable liquid pressure is built up seal 31 will be able to withstand any pressures commonly used in feeding liquid coating material to a rotating atomizing device. The mercury will effectively prevent the solvents and abrasive pigments of the liquid coating material from reaching flexible element 36. In addition the mercury, which is an excellent conductor, will transmit heat generated by the friction between shaft 12 and element 36 away from the flexible element which will serve to prevent deterioration and wear due to excessive heat.

I claim:

1. In an electrostatic spray coating system, a device for feeding solvent-containing liquid coating material comprising a rotatable hollow shaft, an annular-edged atomizer concentrically mounted for rotation on one end of said shaft, a housing having a plurality of bearings for supporting said rotatable hollow shaft, a rotary shaft seal mounted within said housing having a flexible sealing element maintained at all times in sealing contact with said shaft, said housing also having an annular chamber encircling said shaft adjacent to said rotary shaft seal, a predetermined quantity of mercury filling said chamber and maintained at all times in contact with at least a portion of the sealing element of said rotary shaft seal and said shaft, means for rotating said shaft and atomizer about their axis, and means for feeding liquid coating material at a controlled rate to the interior of said hollow shaft for flow therethrough to said atomizer.

2. Apparatus for feeding a solvent-containing liquid coating material to a rotatable atomizer comprising a hollow shaft having one end thereof affixed to said rotatable atomizer, means for supplying solvent-containing liquid coating material to the other end of said hollow shaft for flow therethrough to said rotating atomizer, a housing surrounding at least a portion of said hollow shaft, a bearing mounted within said housing for supporting said hollow shaft, means for rotating said atomizer and hollow shaft on said bearing, a rotary shaft seal mounted within said housing and between said other end of said hollow shaft and said bearing, said rotary shaft seal having an annular flexible element encircling said hollow shaft and maintained at all times in sealing contact with the surface of said shaft, and a predetermined body of mercury encircling said shaft and lying between said other end of said hollow shaft and the annular flexible element of said rotary shaft seal, said body of mercury filling a chamber in said housing and being in contact with both said flexible element and said shaft at all times.

References Cited in the file of this patent

UNITED STATES PATENTS

| | | |
|---|---|---|
| 1,954,192 | Biggs | Apr. 10, 1934 |
| 2,441,708 | Luaces et al. | May 18, 1948 |
| 2,461,655 | Noble | Feb. 15, 1949 |
| 2,584,973 | Andermatt | Feb. 12, 1952 |
| 2,634,177 | Guibert | Apr. 7, 1953 |
| 2,661,984 | Peebles et al. | Dec. 8, 1953 |